United States Patent Office 3,516,872
Patented June 23, 1970

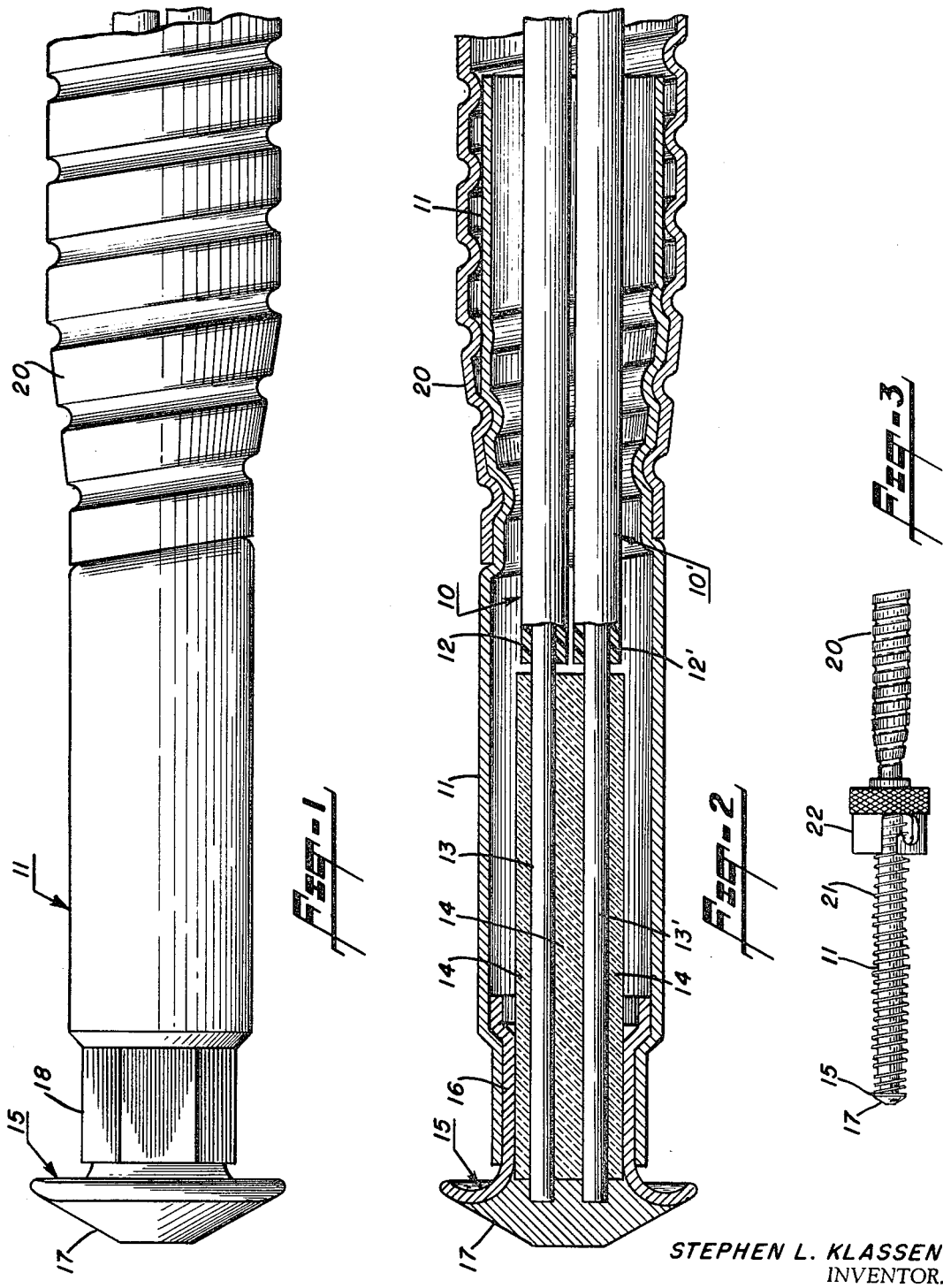

1

3,516,872
SPRING LOADED THERMOCOUPLE WITH A FLARED TIP
Stephen L. Klassen, Saddle Brook, N.J., assignor to Thermo Electric Co., Inc., Saddle Brook, N.J., a corporation of New Jersey
Filed Nov. 10, 1966, Ser. No. 593,525
Int. Cl. H01r 1/02
U.S. Cl. 136—221                    3 Claims

ABSTRACT OF THE DISCLOSURE

A spring-loaded thermocouple is disclosed, comprising a metal hollow member having a shank portion inserted into an end of a metal shell, a pair of thermocouple wires extending through the shell and into the hollow member, and a solder alloy connecting the ends of the wires to each other and to the hollow member.

---

This invention relates to thermocouples and more particularly to a thermocouple tip of improved construction.

A thermocouple tip made in accordance with this invention is of general utility and is particularly useful as a spring-loaded thermocouple. A spring-loaded thermocouple is provided with a spring-biased bayonet cap for securing the thermocouple to a cooperating fitting, thereby to position the thermocouple in operative position within a bore formed in a mounting member for the purpose of measuring and/or controlling temperature. It is desirable that the thermocouple tip be of rugged, yet economical, construction, respond rapidly to changes in temperature, and have a long, operating life even when subjected to relatively high temperature.

An object of this invention is the provision of a thermocouple tip of improved construction.

An object of this invention is the provision of a thermocouple wherein the hot junction comprises the ends of two thermocouple wires imbedded in an exposed metal alloy tip.

An object of this invention is the provision of a thermocouple comprising a metal hollow member having a shank portion inserted into an end of a metal shell, a pair of thermocouple wires extending through the shell and into the hollow member, a solder alloy connecting the ends of the wires to each other and to the hollow member, and means insulating the remaining portions of the wires from each other and the shell.

These and other objects and advantages of the invention will become apparent from the following description when taken in conjunction with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

FIG. 1 is a side elevational view of a thermocouple tip made in accordance with this invention;

FIG. 2 is a central, longitudinal cross-sectional view thereof; and

FIG. 3 is similar to FIG. 1 but drawn to a reduced scale and including the coiled spring and bayonet cap to form a spring load thermocouple.

Referring now to FIGS. 1 and 2, the two thermocouple wires are identified by the numerals 10 and 10', said wires being electrically insulated from each other and the outer, metal shell 11 by the coverings 12, 12'. This insulation covering is stripped from the wires and the bare wire portions 13, 13' extend through parallel holes formed in a ceramic spacer member 14. A metal eyelet 15 has a shank portion extending into a cylindrical shell 11 and the ends of the wires are connected together by means of silver solder 17, thereby to form the hot junction of the thermocouple.

In the manufacture of the thermocouple, the hot junction is formed before the outer shell 11 is inserted into the illustrated position. The bare wires 13, 13' are force-fitted through the holes formed in the ceramic spacer member 14. The eyelet and the spacer member then are supported in a suitable fixture, with the ends of the wires lying substantially flush with the curled-over end portion of the eyelet, and the silver solder is applied. The tight fits between the wires and the ceramic member prevent the solder from running along the wires. Thereafter, the solder mass is ground to the conical, truncated apex shape, as shown. Such shape corresponds to the contour of the bottom of a bore into which the tip is to be inserted during use of the thermocouple. The shank portion of the eyelet then is inserted into the shell and the overlapping portions of these members are crimped into a hexagonal configuration, such configuration of the shell being shown in FIG. 1 and identified by the numeral 18. The parts are so dimensioned that, after the crimping operation, the eyelet shank portion is pressed into firm engagement with the spacer member 14. Thus, the eyelet, shell, spacer member and wires are secured together to form a rigid structure.

The other end of the shell 11 extends beyond the bare portions 13, 13' of the wires. A flexible sheath 20 is inserted over this end of the shell and the overlapping portions of the shell and sheath are swaged together. The swaging blocks are provided with conical inner surfaces such that the end convolution of the flexible sheath lies substantially flush with the outer surface of the shell and several adjacent convolutions form a tapered surface terminating in the normal sheath diameter. This operation secures the sheath to the shell without the use of solder.

A complete spring-loaded thermocouple, is shown in FIG. 3. A coiled spring 21 loosely encircles the shell 11 and is confined between the eyelet 15 and bottom wall of a bayonet cap 22. The spring and shell are insertable into a bore formed in a block or other member, the temperature of which is to be measured or controlled. Such block carries a cooperating fitting to which the bayonet cap may be secured as the spring is compressed, said spring serving to press the thermocouple hot junction 17 against the bottom surface defining the bore and to retain the cap 22 firmly secured to the fitting.

Having now described the invention, those skilled in this art will be able to make various changes and modifications without thereby departing from the spirit and scope of the invention as recited in the following claims.

I claim:
1. A thermocouple comprising,
 (a) a metal tubular shell,
 (b) a metal hollow member having a portion extending into one end of the shell and secured thereto, said member terminating in an outwardly flared tip having a diameter exceeding that of the said shell,
 (c) an insulator member having parallel holes extending therethrough, said member being disposed in the shell with an end portion thereof extending into the said hollow member substantially to the flared tip thereof,
 (d) a pair of thermocouple wires having bare portions passing through the said holes and ends protruding into the flared tip of the hollow member,
 (e) a metal alloy securing the flared tip of the hollow member to the protruding ends of the wires thereby forming a hot junction, said alloy extending beyond the said tip, and (f) a flexible metal sheath having an end portion inserted over the other end of the said shell, such end portions of the sheath and shell being swaged together.

2. The invention as recited in claim 1, wherein the said metal alloy is silver solder and the overlapping portions of the shell and hollow member are crimped together.

3. The invention as recited in claim 2, including a bayonet cap slidably carried by the said shell, and a coiled spring encircling the shell and confined between the said cap and the flared tip of the hollow member.

References Cited
UNITED STATES PATENTS

| | | | |
|---|---|---|---|
| 2,476,099 | 7/1949 | Knudsen | 136—232 |
| 2,517,033 | 8/1950 | Russell | 136—229 |
| 2,752,411 | 6/1956 | Walter | 136—221 |
| 3,281,518 | 10/1966 | Stroud et al. | 73—359 |

WINSTON A. DOUGLAS, Primary Examiner

M. J. ANDREWS, Assistant Examiner